United States Patent
Suga

(10) Patent No.: US 7,242,539 B2
(45) Date of Patent: Jul. 10, 2007

(54) IMAGE SCANNING APPARATUS

(75) Inventor: Takayuki Suga, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/071,484

(22) Filed: Mar. 3, 2005

(65) Prior Publication Data

US 2005/0200980 A1    Sep. 15, 2005

(30) Foreign Application Priority Data

Mar. 11, 2004    (JP)    ............... 2004-069169

(51) Int. Cl.
*G02B 7/02*    (2006.01)

(52) U.S. Cl. ...................... 359/819; 811/820

(58) Field of Classification Search ........ 359/819–823, 359/703, 704, 811, 820; 396/111, 529; 353/100; 362/455; 250/216, 529; 355/55

See application file for complete search history.

(56) References Cited

U.S. PATENT DOCUMENTS

| 4,585,308 | A | * | 4/1986 | Negoro | ................... 359/830 |
| 5,246,192 | A | * | 9/1993 | Aberi et al. | ............. 248/178.1 |
| 5,864,437 | A | * | 1/1999 | Takemoto | ................... 359/819 |
| 6,178,016 | B1 | * | 1/2001 | Ashe et al. | ................. 358/487 |
| 6,747,818 | B2 | * | 6/2004 | Ohashi et al. | ............. 359/806 |

FOREIGN PATENT DOCUMENTS

JP    09-049957 A    2/1997

\* cited by examiner

*Primary Examiner*—Hung Dang
*Assistant Examiner*—Joseph Martinez
(74) *Attorney, Agent, or Firm*—Canon U.S.A. Inc I.P. Div

(57) ABSTRACT

An image scanning apparatus that forms an optical image of a document with an image-forming lens onto an image sensor. In order to prevent deterioration in image-forming performance, the image scanning apparatus includes a restricting member for restricting displacement of the image-forming lens in the direction of the optical axis. The restricting member is provided on a supporting member for supporting the image-forming lens and the image sensor.

3 Claims, 4 Drawing Sheets

INCIDENT SIDE

IMAGE-FORMING SIDE

IMAGE SCANNING APPARATUS

BACKGROUND OF THE INVENTION

1. Field of the Invention

The present invention relates to an image scanning apparatus used for copying machines, facsimiles, and image scanners.

2. Description of the Related Art

In general, image scanning apparatuses used for copying machines, facsimiles, and image scanners include a scanning optical system, a lens unit, and an image sensor. The scanning optical system includes an exposing lamp and a plurality of mirrors. The lens unit includes a lens barrel containing a plurality of lenses. The scanning optical system scans the surface of a document to obtain reflected light. The reflected light is made to form an optical image on the image sensor by the lens unit. The optical image is converted into an electric signal.

Recent improvements in the quality of the scanned image and in the scanning speed necessitate an increase in the amount of light of the exposing lamp and in the driving speed of the image sensor. Due to the heat emitted from the exposing lamp and the image sensor, the temperature inside the image scanning apparatus rises significantly.

The relative position of the document and the lens unit and the relative position of the lens unit and the image sensor are adjusted so as to satisfy a predetermined optical performance when the image scanning apparatus is constructed. However, when the temperature inside the apparatus rises, the relative positions change due to thermal expansion of the lens barrel and a supporting member for supporting the lens unit and the image sensor, and consequently the optical performance deteriorates.

To solve such a problem, Japanese Patent Laid-Open No. 9-049957 discloses an image scanning apparatus in which the focal length of the lens unit at room temperature is longer (or shorter) than that when the temperature is higher than room temperature; and the thermal expansion coefficient of the lens barrel is larger (or smaller) than that of the supporting member for supporting the lens unit and the image sensor.

That is to say, in the above image scanning apparatus, the thermal expansion coefficients of the lens barrel and the supporting member are determined in accordance with the change in the focal length due to the temperature rise. However, if the amount of change in the focal length cannot be compensated by thermal expansion of the members, optical performance deteriorates. Factors such as strength and cost can limit the materials used for the members. In some cases, deterioration in optical performance due to temperature rise cannot be compensated.

SUMMARY OF THE INVENTION

The present invention provides an image scanning apparatus including a simple device for preventing deterioration in optical image-forming performance due to temperature rise inside the apparatus.

In one aspect of the present invention, an image scanning apparatus includes an image-forming optical element, a barrel, an image sensor, a supporting member, and a restricting member. The barrel contains the image-forming optical element. The image-forming optical element has an optical axis and is configured to form an optical image of a document. The image sensor converts the optical image formed by the image-forming optical element into an electric signal. The supporting member supports the barrel from a direction perpendicular to the optical axis of the image-forming optical element, and supports the image sensor. The restricting member is fixed to the supporting member and contacts at least one end of the barrel in the direction of the optical axis. The restricting member restricts the at least one end of the barrel from being displaced in the direction of the optical axis.

Further features and advantages of the present invention will become apparent from the following description of exemplary embodiments (with reference to the attached drawings).

DESCRIPTION OF THE EMBODIMENTS

The embodiments of the present invention will now be described with reference to the drawings.

First Embodiment

An image scanning apparatus according to a first embodiment of the present invention will be described with reference to FIGS. 1 and 3.

Figure 1:
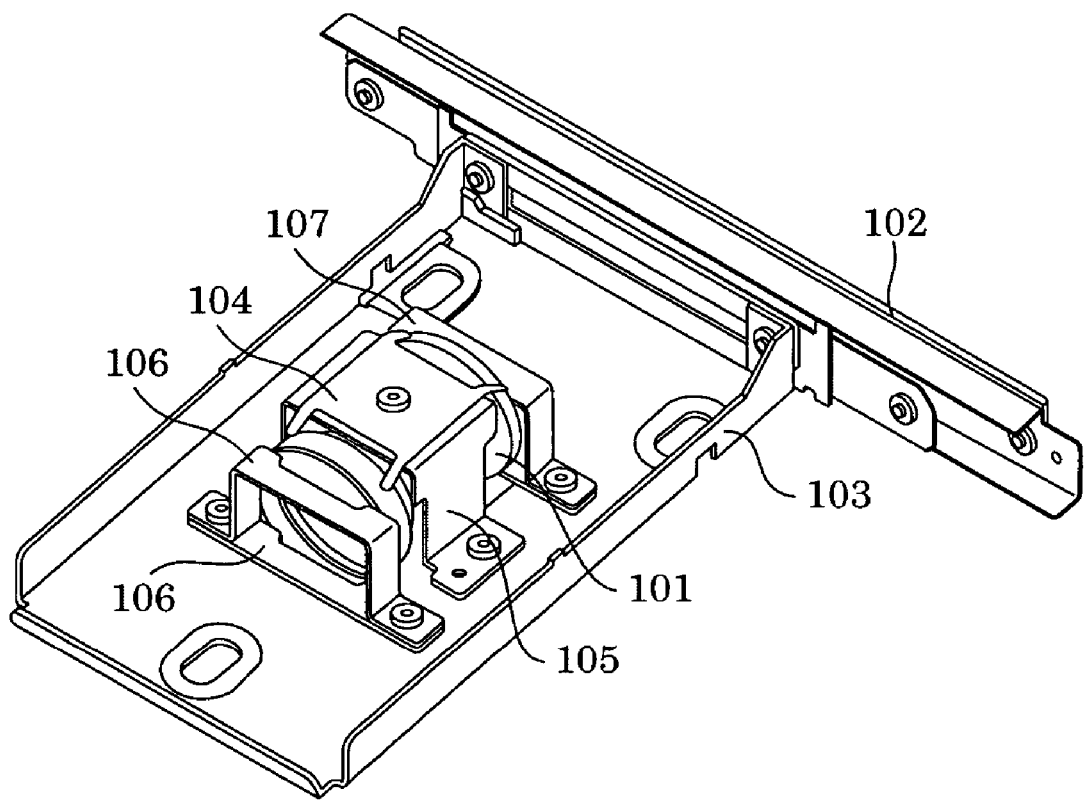
FIG. 1 is a perspective view of an image scanning apparatus according to a first embodiment of the present invention.

FIG. 1 shows an optical image forming unit including a lens unit 101 and a CCD sensor board unit 102. The lens unit 101 is composed of a plurality of lenses and a resin barrel holding them. The light coming from the document is made to form an optical image by the lens unit 101. The CCD sensor board unit 102 includes a CCD sensor. The optical image is photo-electrically converted by the CCD sensor. The lens unit 101 and the CCD sensor board unit 102 are held by a base frame 103. The base frame 103 is fixed to the main body of the image scanning apparatus. The base frame 103 includes a guide portion (not shown) for holding the lens unit 101 so that the lens unit 101 can move in the direction of the optical axis but cannot move in the direction perpendicular to the optical axis. This guide portion is a rectangular hole provided in the base frame 103. The width of the hole is smaller than the diameter of the lens unit 101. The length of the hole is larger than the size in the direction of the optical axis of the lens unit 101. A lens holder 104 presses the lens unit 101 against the guide portion of the base frame 103 by elasticity, thereby holding the lens unit 101 in the base frame 103. The lens holder 104 is held by a bracket 105. Restricting plates 106 and 107 restrict the expansion in the direction of the optical axis of the lens unit 101 due to the temperature rise inside the image scanning apparatus. The base frame 103, a member for fixing the CCD sensor board unit 102 to the base frame 103, and the restricting plates 106 and 107 are formed of a metal, such as iron, that is more rigid than the resin forming the barrel of the lens unit 101 and has a thermal expansion coefficient smaller than that of the resin. In this embodiment, the length of the barrel of the lens unit 101 is about 40 mm, and the distance from the lens unit 101 to the CCD sensor board unit 102, more specifically, the distance from the end of the barrel facing the CCD sensor to the CCD sensor is about 50 mm.

The restricting plates 106 and 107 are disposed in front of and behind the lens unit 101 so as to sandwich the lens unit 101 in the direction of the optical axis. Each of the restricting plates 106 and 107 is in contact with the front end or the rear end of the barrel at four points, more specifically, at two upper points and two lower points. The restricting plates 106 and 107 are fixed to the base frame 103.

Figure 3:
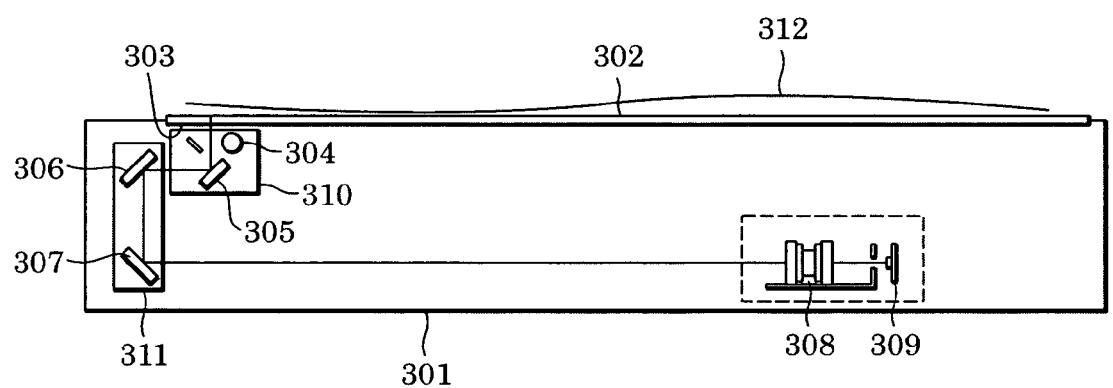
FIG. 3 is a sectional view of an image scanning apparatus according to the present invention.

FIG. 3 shows the overall structure of the image scanning apparatus. The main body 301 of the image scanning apparatus includes a document table glass 302, a light source 304, a first mirror 305, a second mirror 306, a third mirror 307, a lens unit 308, and a CCD sensor board unit 309. The first mirror 305 is held by a first scanning unit 310. The second mirror 306 and the third mirror 307 are held by a second scanning unit 311. The first scanning unit 310 and the second scanning unit 311 are moved by a motor (not shown). A document 312 placed on the document table glass 302 is illuminated with the light source 304 and is optically scanned by the first scanning unit 310 and the second scanning unit 311. The optical image of the document 312 is formed on the CCD sensor of the CCD sensor board unit 309 by the lens unit 308 so as to be read. The portion enclosed by a dotted line in FIG. 3 corresponds to the optical image forming unit shown in FIG. 1.

The positional relation between the lens unit 101 and the CCD sensor board unit 102 is adjusted so as to satisfy a predetermined optical performance, and then the lens unit 101 and the CCD sensor board unit 102 are fixed to the base frame 103. Thereafter, the restricting plates 106 and 107 are fixed to the base frame 103 so as to be in contact with the front end and the rear end of the lens unit 101.

When the image scanning apparatus is operated, the temperature inside the image scanning apparatus rises due to heat emitted from the CCD sensor board unit 102, a lamp unit (not shown), an image processing board unit (not shown), and so on. Therefore, each member thermally expands. Since being formed of resin, the barrel constituting the lens unit 101 has a large thermal expansion coefficient (20 μm/m·K in the flow direction of resin, 60 μm/m·K in the direction perpendicular thereto). Therefore, the position of the lenses in the lens unit 101 can change significantly. If the position of the lenses changes, the focal length changes. Since desired optical performance cannot be obtained, the scanned image deteriorates. When the image scanning apparatus is operated continuously, the temperature in the vicinity of the optical image forming unit rises about 25° C. above the initial condition. The focal depth of the lens unit 101 is about 100 μm. As long as the surface of the CCD sensor is located within the focal depth, desired optical performance can be obtained. However, if the resin barrel thermally expands, the focal position is shifted by about 60 to 80 μm. The surface of the CCD sensor can consequently be out of the focal depth. According to this embodiment, the restricting plates 106 and 107 have rigidity higher than the resin barrel, and restrict expansion of the barrel, thereby preventing the relative position of the lenses and the base frame 103 from changing. The optical performance is thus prevented from deteriorating.

The base frame 103 and the member for fixing the CCD sensor board unit 102 to the base frame 103 also expand thermally. These are formed of a metal such as iron, whose thermal expansion coefficient is about 12.0 μm/m·K. Since the distance between the restricting plate 107 and the CCD sensor board unit 102 is about 50 mm, when the temperature in the vicinity of the optical image forming unit rises by about 25° C. due to continuous operation of the image scanning apparatus, thermal expansion is about $$12.0 \times (50 \times 10^{-3}) \times 25 = 15 \, [\mu m]$$

Therefore, the distance between the restricting plate 107 and the CCD sensor board unit 102 increases by about 15 μm. However, since the focal depth of the lens unit 101 is about 100 μm, the thermal expansion is sufficiently negligible by comparison. Unlike the deterioration in the optical performance due to the thermal expansion of the lens unit 101, the effect of this thermal expansion on the optical performance is sufficiently negligible. In addition, since the barrel of the lens unit 101 is about 40 mm in length in the direction of the focal axis, when it is overestimated that the thermal expansion coefficient of resin is about 60 μm/m·K, and the temperature rises by 25° C., if no restricting plates 106 and 107 are provided, the barrel of the lens unit 101 expands by about 60 μm. In this embodiment, the expansion in the direction of the focal axis is restricted by the rigid restricting plates 106 and 107 and the rigid base frame 103. The expansion of the barrel is limited to about 12 μm, which is the expansion of the base frame 103 between the restricting plates 106 and 107. Therefore, displacement of the lenses in the barrel of the lens unit 101 is limited to about 12 μm. Even if the displacement of the lenses in the lens unit 101 (12 μm) is simply added to the thermal expansion of the distance between the lens unit 101 and the CCD sensor board unit 102 (15 μm), it totals 27 μm and is well within the focal depth (100 μm).

In this embodiment, each restricting plate is in contact with the rim of the barrel at four points, more specifically, at two upper points and two lower points. However, the present invention is not limited to this. Each restricting plate may be in contact with the rim of the barrel only at upper points or lower points. Alternatively, each restricting plate may be fully in contact with the rim of the barrel. In any case, deterioration in optical performance due to thermal expansion can be restricted.

Second Embodiment

Figure 2:
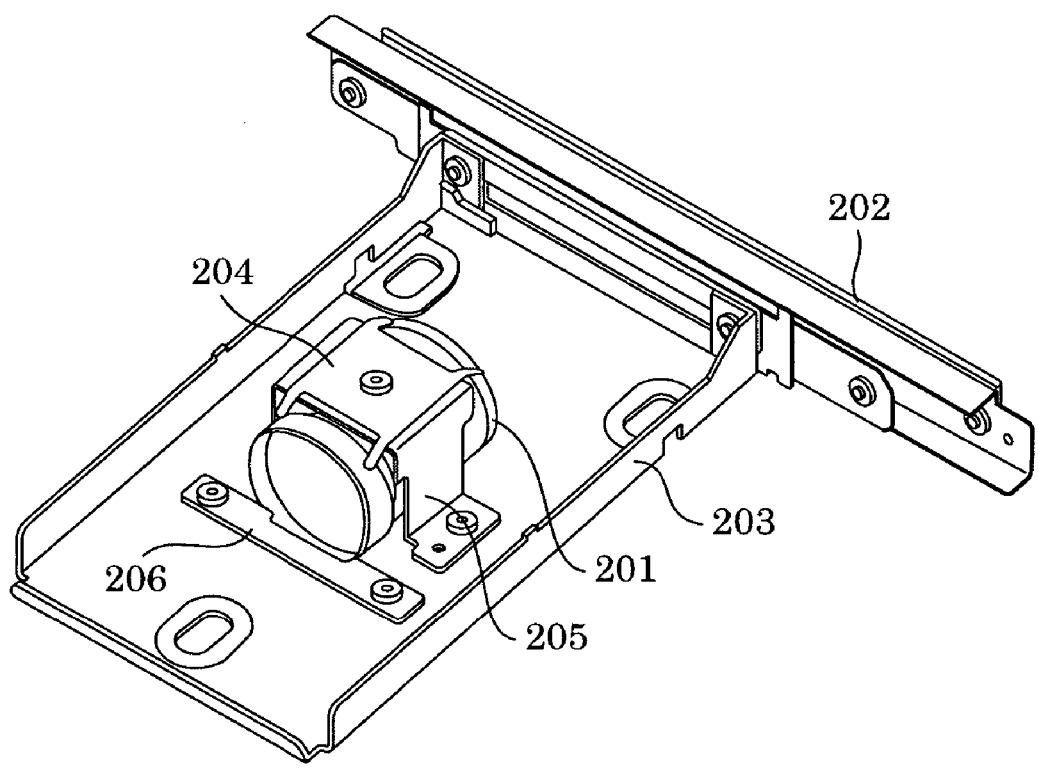
FIG. 2 is a perspective view of an image scanning apparatus according to a second embodiment of the present invention.

An image scanning apparatus according to a second embodiment of the present invention will be described with reference to FIG. 2.

A lens unit 201 is composed of a plurality of lenses and a resin barrel holding them. Light coming from the document is made to form an optical image by the lens unit 201. A CCD sensor board unit 202 includes a CCD sensor. The optical image is photo-electrically converted by the CCD sensor. The lens unit 201 and the CCD sensor board unit 202 are held by a base frame 203. The base frame 203 includes a guide portion for holding the lens unit 201 so that the lens unit 201 can move in the direction of the optical axis but cannot move in the direction perpendicular to the optical axis. A lens holder 204 presses the lens unit 201 against the guide portion of the base frame 203, thereby restricting the lens unit 201 from moving in the direction of the optical axis. The lens holder 204 is held by a bracket 205. A restricting plate 206 restricts the expansion in the direction toward the incident side of the lens unit 201 due to the temperature rise inside the image scanning apparatus. The base frame 203, and a member for fixing the CCD sensor board unit 202 to the base frame 203 are formed of a metal, such as iron. The restricting plate 206 is disposed on the incident side of the lens unit 201. The restricting plate 206 is in contact with the rim of the barrel at two lower points. The restricting plate 206 is fixed to the base frame 203. The size of each member is the same as in the first embodiment.

The positional relation between the lens unit 201 and the CCD sensor board unit 202 is adjusted so as to satisfy a predetermined optical performance, and then the lens unit 201 and the CCD sensor board unit 202 are fixed to the base frame 203 with the lens holder 204, the bracket 205, and so on. Thereafter, the restricting plate 206 is fixed to the base frame 203 so as to be in contact with the rim on the incident side of the lens unit 201.

Figure 4:
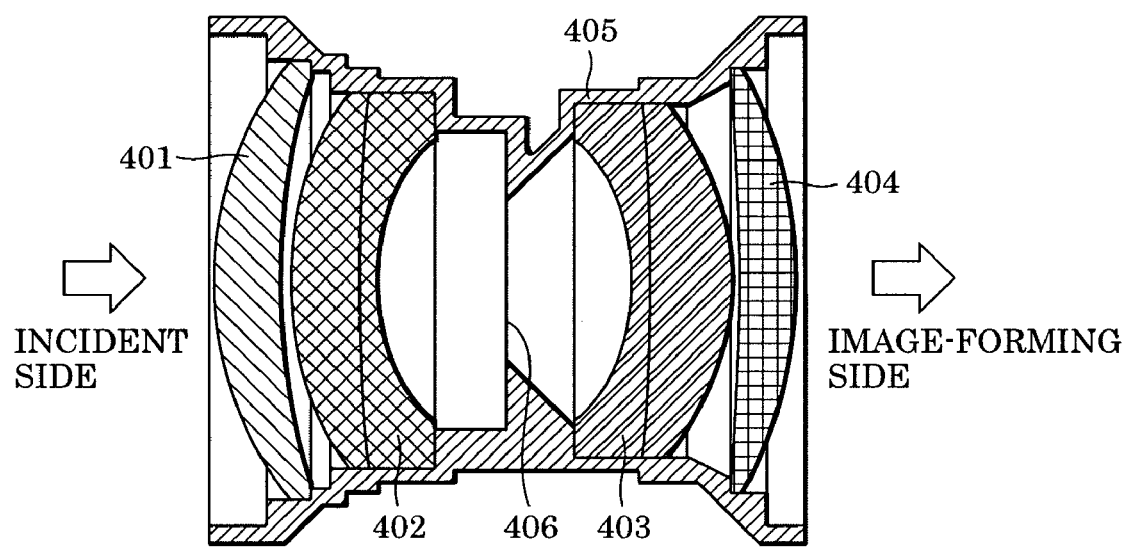
FIG. 4 is a sectional view of an optical image forming unit of an image scanning apparatus according to the present invention.

When the image scanning apparatus is operated, the temperature inside the image scanning apparatus rises due to the heat emitted from the CCD sensor board unit 202, a lamp unit (not shown), an image processing board unit (not shown), and so on. Therefore, each member thermally expands. FIG. 4 is a sectional view of the lens unit 201. As shown in FIG. 4, the lens unit 201 includes a plurality of lenses (six elements in four groups including two sets of cemented doublets in this embodiment). These lenses are disposed in predetermined positions inside the barrel for good optical performance. When the barrel of the lens unit 201 expands thermally, the lenses move out of position. Since the restricting plate is provided only at one end of the lens unit 201, when temperature rises, the restricting plate does not restrict the barrel from expanding thermally in the direction of the optical axis, and therefore compressing force is not exerted on the barrel.

Of the lenses constituting the lens unit 201, the lens having the largest power (refractive power to refract incident light rays) has the most significant effect on optical performance when the lens is displaced. As shown in FIG. 4, lenses 401 to 404 constituting the lens unit 201 are arranged symmetrically on both sides of a diaphragm 406. The lenses 401 to 404 and the diaphragm 406 are contained in the barrel 405. In such a case, the lens nearest to the end on the incident side of the lens unit 201 is generally given the largest power. Therefore, the lens 401 in FIG. 4 has the most significant effect on optical performance when displaced. In this embodiment, the restricting plate 206 is in contact with the rim of the barrel on the incident side of the lens unit so as to restrict the lens 401 from being displaced. Therefore, the structure is simple, and deterioration in optical performance due to thermal expansion of the barrel 405 is effectively restricted.

Since the barrel of the lens unit 201 is about 40 mm in length in the direction of the focal axis, and the distance between the lens unit 201 and the CCD sensor board unit 202 is about 50 mm, the distance between the restricting plate 206 and the CCD sensor board unit 202 is about 90 mm. The base frame 203 is formed of a metal such as iron, whose thermal expansion coefficient is about 12.0 µm/m·K. Since the distance between the restricting plate 206 and the CCD sensor board unit 202 is about 90 mm, when the temperature in the vicinity of the optical image forming unit rises by about 25° C. due to continuous operation of the image scanning apparatus, the base frame 203 between the restricting plate 206 and the CCD sensor board unit 202 expands thermally by about 27 µm. Of the lenses 401 to 404 constituting the lens unit 201, the lens 401 has the largest power. Due to temperature rise by 25° C., the lens 401 is displaced by about 27 µm in the direction of the optical axis.

Since the focal depth of the lens unit 201 is 100 µm, this thermal expansion is sufficiently negligible. That is to say, the effect of this thermal expansion on the optical performance is sufficiently negligible. In addition, as is clear from FIG. 4, the distance from the end on the incident side of the barrel 405 to the lens 401 is a few millimeters, and therefore is also negligible.

In this embodiment, the restricting plate is in contact with the rim of the barrel at two lower points. However, the present invention is not limited to this. The restricting plate may be in contact with the rim of the barrel at two upper points. The restricting plate may be in contact with the rim of the barrel at four points more specifically, at two upper points and two lower points. Alternatively, the restricting plate may be fully in contact with the rim of the barrel. In any case, deterioration in optical performance due to thermal expansion can be restricted. In the case where the lens having the largest power is located on the optical image-forming side of the lens unit 201, the restricting plate is also disposed on the optical image-forming side of the lens unit 201.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-069169 filed Mar. 11, 2004, which is hereby incorporated by reference herein.

What is claimed is:

1. An image scanning apparatus comprising:
 a plurality of lenses configured to form an optical image of a document;
 a barrel configured to hold the plurality of lenses, wherein a lens having the largest refractive power of the plurality of lenses is disposed adjacent to an incident end of the barrel;
 an image sensor converting the optical image formed by the plurality of lenses into an electric signal;
 a supporting member supporting the image sensor and the barrel;
 a pressing member configured to press the barrel against the supporting member; and
 a restricting member configured to contact at least two points on the incident end of the barrel so as to restrict the incident end of the barrel from being expanded in the direction of an optical axis of the lens, wherein the restricting member is fixed to the supporting member and is more rigid than the barrel.

2. The image scanning apparatus according to claim 1, wherein the restricting member restricts the incident end of the barrel from being thermally expanded in the direction of the optical axis of the lens.

3. The image scanning apparatus according to claim 1, wherein the restricting member contacts at upper and lower points of the incident end of the barrel.

* * * * *